United States Patent
Gill

(10) Patent No.: US 9,762,075 B1
(45) Date of Patent: Sep. 12, 2017

(54) USB CONNECTOR FOR WALKIE TALKIE BATTERIES

(71) Applicant: James G. Gill, Glendale, CA (US)

(72) Inventor: James G. Gill, Glendale, CA (US)

( * ) Notice: Subject to any disclaimer, the term of this patent is extended or adjusted under 35 U.S.C. 154(b) by 13 days.

(21) Appl. No.: 14/631,455

(22) Filed: Feb. 25, 2015

Related U.S. Application Data

(60) Provisional application No. 61/944,259, filed on Feb. 25, 2014.

(51) Int. Cl.
*H02J 7/00* (2006.01)

(52) U.S. Cl.
CPC .......... *H02J 7/0054* (2013.01); *H02J 7/0042* (2013.01); *H02J 2007/0062* (2013.01)

(58) Field of Classification Search
CPC . H02J 7/0054; H02J 7/0042; H02J 2007/0062
See application file for complete search history.

(56) References Cited

U.S. PATENT DOCUMENTS

| | | |
|---|---|---|
| 6,792,297 B2 | 9/2004 | Cannon |
| 7,501,792 B2 | 3/2009 | Börjeson |
| 7,640,041 B2 | 12/2009 | Ragan |
| 7,676,192 B1 | 3/2010 | Wilson |
| 7,679,321 B2 | 3/2010 | Takeshita |
| 7,952,322 B2 | 5/2011 | Partovi |
| 7,965,231 B2 | 6/2011 | Kirmuss |
| 8,080,975 B2 | 12/2011 | Bessa |
| 8,116,796 B2 | 2/2012 | Boyer |
| 8,169,185 B2 | 5/2012 | Partovi |
| 8,237,414 B1 | 8/2012 | Li |
| 8,253,371 B2 | 8/2012 | Vitanov |
| 8,285,327 B2 | 10/2012 | Pattenden |
| 8,319,471 B2 | 11/2012 | Adest |
| 8,406,684 B1 * | 3/2013 | Yeh ..................... H04W 76/005 455/3.05 |
| 2003/0073469 A1 * | 4/2003 | Wu ..................... H04M 1/6041 455/569.2 |
| 2003/0153355 A1 * | 8/2003 | Warren ................. G06F 1/1616 455/557 |
| 2009/0033552 A1 * | 2/2009 | Kirmuss ................ G01C 21/20 342/357.75 |
| 2009/0061799 A1 * | 3/2009 | Park .................. H04W 52/0258 455/127.5 |
| 2009/0179612 A1 * | 7/2009 | Sherman ............... G06F 1/1626 320/103 |
| 2011/0016333 A1 * | 1/2011 | Scott ....................... G06F 1/266 713/300 |
| 2011/0050164 A1 | 3/2011 | Partovi |

(Continued)

FOREIGN PATENT DOCUMENTS

WO      2010129369 A2      11/2010

*Primary Examiner* — Nathan Mitchell
(74) *Attorney, Agent, or Firm* — James Creighton Wray; Meera P. Narasimhan

(57) ABSTRACT

Portable RF radio transceivers, commonly known as walkie talkies, are powered by common replaceable batteries. Mobile devices, including cell phones, are chargeable from the walkie talkies having power output ports. USB or mini USB ports on the walkie talkies are used for the power outputs to charge mobile devices while moving through locations without interrupting both types of the communication devices.

15 Claims, 3 Drawing Sheets

FIG. 2

(56) References Cited

U.S. PATENT DOCUMENTS

| | | | | |
|---|---|---|---|---|
| 2012/0071215 A1* | 3/2012 | Bourque | ............... | G06F 1/266 |
| | | | | 455/573 |
| 2012/0231857 A1* | 9/2012 | Hsu | ............... | H04M 19/08 |
| | | | | 455/573 |
| 2012/0266001 A1* | 10/2012 | Sha | ............... | H02J 7/0004 |
| | | | | 713/300 |
| 2013/0034230 A1* | 2/2013 | Takahashi | ........... | H04W 12/02 |
| | | | | 380/270 |
| 2013/0102365 A1* | 4/2013 | Oh | ............... | H04M 1/04 |
| | | | | 455/566 |
| 2013/0143605 A1* | 6/2013 | Chiu | ............... | H04L 1/0054 |
| | | | | 455/458 |
| 2015/0050963 A1* | 2/2015 | Rokusek | ........... | G06F 1/266 |
| | | | | 455/566 |
| 2015/0106536 A1* | 4/2015 | Lauby | ............... | H02J 7/0042 |
| | | | | 710/8 |
| 2015/0214684 A1* | 7/2015 | Chen | ............... | H01R 35/04 |
| | | | | 439/217 |

\* cited by examiner

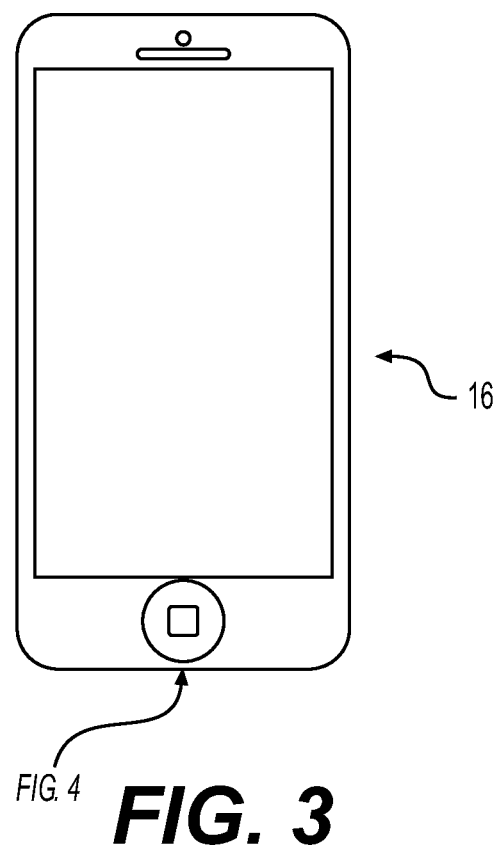
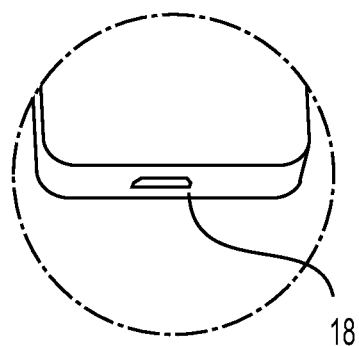
FIG. 3
FIG. 4

USB CONNECTOR FOR WALKIE TALKIE BATTERIES

This application claims the benefit of U.S. Provisional Application No. 61/944,259 filed Feb. 25, 2014, which is hereby incorporated by reference in its entirety as if fully set forth herein.

BACKGROUND OF THE INVENTION

Today we rely heavily on mobile phones for various forms of every day communication. One common complaint in the mobile electronic device industry is inadequate battery life. New advanced features and applications are constantly being added to existing smartphones, coupled with the proliferation of higher definition images online and video streaming. Battery technology has not kept pace with the power-draining applications being added to smartphones.

One possible solution in the past was to carry a spare battery. However, it is likely that a spare battery would discharge over time. Moreover, with the widespread use of smartphones such as the Apple iPhone, there are many smartphones that do not have replaceable batteries.

Walkie talkies, which are two-way radio frequency transceivers, are used in entertainment sites, construction sites, businesses and warehouses. Workers carrying walkie talkies at those locations also have cell phones to be able to talk with off-site people. Fresh batteries are readily available at those locations for use in the walkie talkies. However, batteries in cell phones cannot be replaced, and it is necessary to connect cell phones to fixed electrical outlets for recharging. That takes the workers out of off-site communication capability while they move around the work location.

New cell phones and smartphones require recharging, typically using a wall charger or car charger, and cannot be supported by spare batteries. People on the move away from walls, automobiles, and trucks cannot easily use a power charger. One remedy for this problem was that separate portable power-packs were available. The disadvantage was that persons would have to carry the spare power-packs tethered to their phones. The portable power-packs are cumbersome and likely would discharge and lose power when most needed, such that the charged reservoir would not be available when needed.

Needs exist for new and less cumbersome mobile cell phone chargers.

SUMMARY OF THE INVENTION

The present invention addresses the general problem of charging a cell phone or other mobile device while being mobile. The teachings described herein generally relate to a power supply that can be used to carry, charge, and power a portable electronic device. In the movie industry, workers typically carry on their person walkie talkies that employ rechargeable batteries. Replacement batteries are always on site nearby.

The present invention provides walkie talkies with built in USB ports and/or mini-USB ports. The built in ports would be used to provide power to recharge a cell phone while the person carrying the equipment is on the move and is independently mobile. A walkie talkie with built in USB ports, mini-USB ports and/or external power ports would eliminate the need to carry separate devices designed solely for the purpose of acting as an emergency power backup.

Portable RF radio transceivers, commonly known as walkie talkies, are powered by common replaceable batteries. Cell phones and other mobile devices are chargeable from the walkie talkies having power output ports. USB or mini USB ports on the walkie talkies are used for the power outputs to charge mobile devices, including cell phones, while moving through locations without delay or interruption of communications through the portable RF transceivers and mobile devices.

Although the walkie talkie's own battery life would be drained as a result of charging a cell phone, access to fresh walkie talkie batteries is easy to come by. The walkie talkie batteries are replaced as need be from nearby supplies, allowing the user to continue to charge his or her mobile devices through a freshly charged walkie talkie while mobile and moving around.

The present invention provides a USB port and/or a mini-USB port located in the sides or within a bottom of the walkie talkie or anywhere on the walkie talkie. Using a USB cable or universal mini-USB cell phone charger or adapter, the user could hook up his or her mobile device to the walkie talkie while mobile. The present invention also comprises an adapter plate that fits between a walkie talkie and a battery. This adaptor plate contains a USB port and/or mini-USB port as well as a voltage regulator board that can be used on existing walkie talkies and their batteries.

A cell phone charger charges a mobile device providing power from a walkie talkie. A portable power supply is provided in the walkie talkie. A USB port is provided on the walkie talkie. A power connection runs from the power supply in the walkie talkie to the USB port. A mobile device charging power output in the power connection to the USB port charges a mobile device from the portable power supply in the walkie talkie.

The USB port is a mini USB port. Replaceable batteries are provided in the power supply of the walkie talkie. A power cord with a USB plug is provided on a first end and a mobile device connector is provided on a second end, connecting a USB plug to the USB port in the walkie talkie and connecting the mobile device connector to a mobile device for charging the cell phone.

A walkie talkie has a power supply within the walkie talkie. A power output on the walkie talkie is connected to the power supply. A first end of an electrical connector is connected to the power output, and a second end of the electrical connector is connected to a charging input of a mobile device for recharging a battery in the mobile device.

The invention uses a portable body having a two-way radio frequency transceiver in the portable body. A power supply in the portable body is connected to the radio transceiver. An output power jack on the body is connected to the power supply and is adapted to receive a connector to a mobile device for recharging a battery in a mobile device from the power supply of the portable transceiver. The power supply has replaceable batteries. The replaceable batteries are rechargeable or non-rechargeable batteries.

One mobile device is a cell phone and the power jack is a USB port. A mini USB port also could be mounted on the body and connected to the power supply.

An adapter plate adapted for affixing to the portable RF transceiver body has one or more output jacks. One output jack is a USB port.

A mini USB port is mounted on the adapter plate and connected to the power supply.

BRIEF DESCRIPTION OF THE DRAWINGS

FIG. 3 is a drawing of a commercially available cell phone.

FIG. 4 shows the bottom of a commercially available cell phone having a charging port.

DETAILED DESCRIPTION

Figure 1:
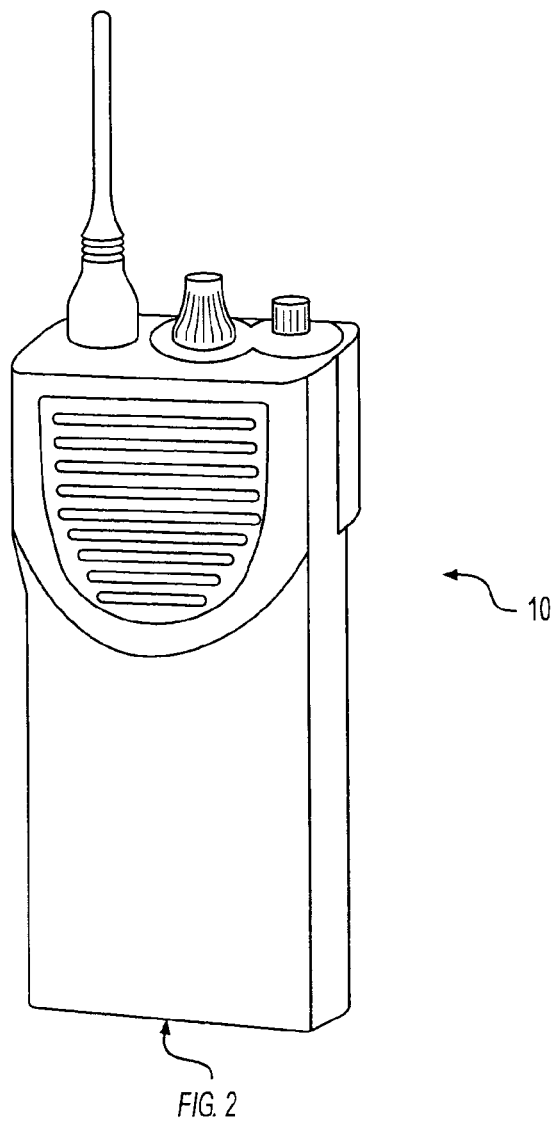
FIG. 1 shows a perspective view of a walkie talkie having a new USB port for cell phone charge.

A walkie talkie 10 with a USB port 12 and a mini-USB port 14 built thereon. A USB-to-mini-USB connector cable 20 is inserted into the USB port 12 of the walkie talkie 10 connecting it to the mini-USB charging port 18 of common commercially available smartphones 16. A USB-to-iPhone charging port connector cable 22 is inserted into the USB port 12 of the walkie talkie 10 connecting it to the charging port 18 of an iPhone 16. The walkie talkie 10 recharges the cell phone 16 or other mobile devices through the USB connecting cables or adapters. Cell phones charge from a 5V USB supply. The walkie talkie has a circuit to convert the battery voltage to the 5V necessary to supply the USB charger outlet.

When the walkie talkie runs out of charge, its rechargeable battery is replaced, allowing the user to continue charging his or her mobile devices while mobile and without having to use stationary wall chargers or car chargers.

Figure 2:
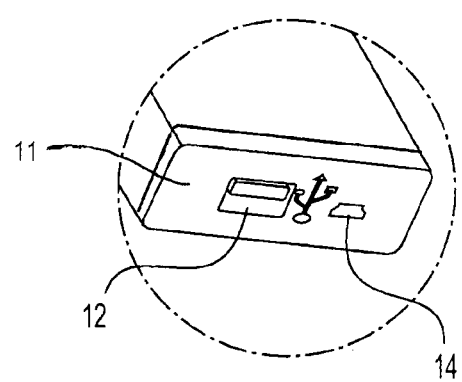
FIG. 2 is a detailed drawing of the bottom of a walkie talkie having USB ports and mini-USB ports.

FIGS. 1 and 2 are drawings of a walkie talkie 10 containing both USB ports 12 and mini-USB 14 ports built in. An adapter plate 11 adapted for affixing to the portable RF transceiver body such as walkie talkie 10 has one or more output jacks 12, 14. These ports are designed for the transfer of charge. FIGS. 2 and 4 are drawings of a commercially available smartphone 16 and charging port 18 located on the bottom of the device.

Figure 5:
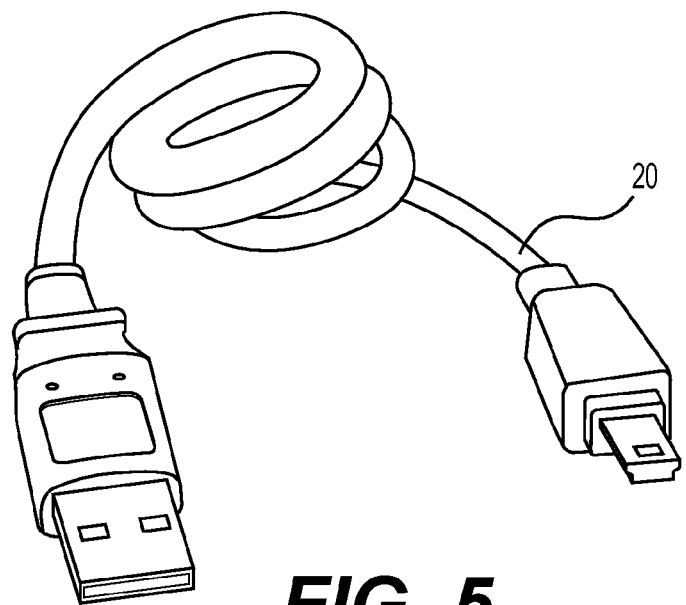
FIG. 5 is a photograph of a USB-to-mini-USB connector cable.
Figure 6:
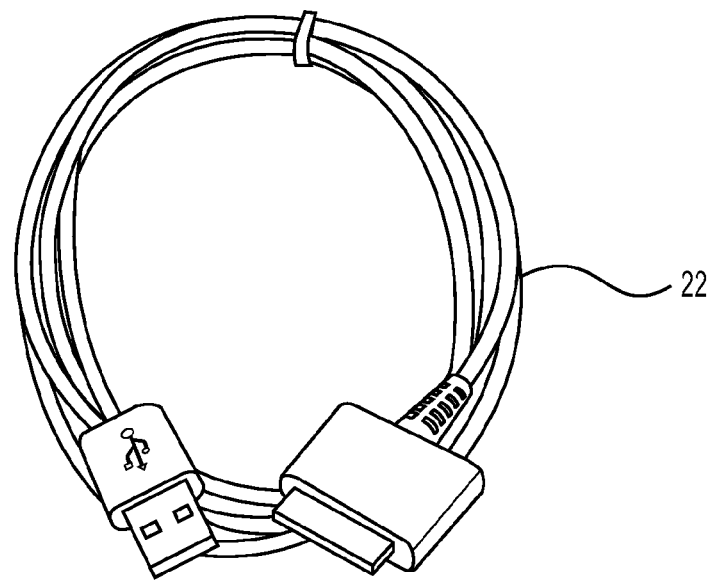
FIG. 6 is a photograph of a USB-to-iPhone charging port connector cable.

FIGS. 5 and 6 are photographs of various connecting cables. FIG. 5 is a photograph of a USB-to-mini-USB universal connecting cable 20, similar to those employed by most smartphones and other mobile devices. FIG. 6 is a photograph of a USB-to-iPhone charging port connector cable 22, which would be used to connect to and charge an iPhone using the present invention 10.

While the invention has been described with reference to specific embodiments, modifications and variations of the invention may be constructed without departing from the scope of the invention, which is defined in the following claims.

I claim:

1. A method comprising:
providing a walkie talkie,
providing a portable power supply in the walkie talkie,
providing at least one USB port on the walkie talkie,
providing an adapter in the walkie talkie as a power connection from the portable power supply in the walkie talkie to the USB port,
providing a mobile device independent of the walkie talkie,
providing a charger for charging the mobile device, and
providing a removable portable unidirectional power connection between the walkie talkie and the mobile device,
connecting the removable portable power connection to the at least one USB port and the mobile device, and
charging the mobile device from the portable power supply in the walkie talkie, wherein the walkie talkie is not capable of receiving charge from the mobile device.

2. The method of claim 1, wherein the at least one USB port is a mini USB port.

3. The method of claim 1, wherein the providing the portable power supply comprises providing replaceable batteries in the power supply of the walkie talkie.

4. The method of claim 1, wherein providing the removable portable power connection comprises providing a power cord with a USB plug on a first end and a mobile device connector on a second end, connecting the USB plug to the at least one USB port in the walkie talkie and connecting the mobile device connector to the mobile device for charging the mobile device.

5. A method comprising:
providing a walkie talkie,
providing a portable power supply in the walkie talkie,
providing a power output on the walkie talkie,
connecting the power output to the portable power supply via an adapter in the walkie talkie,
providing a mobile device independent from the walkie talkie,
providing a power input on the mobile device,
providing an unidirectional electrical connector,
connecting a first end of the electrical connector to the power output,
connecting a second end of the electrical connector to the power input of the mobile device, and
recharging a battery in the mobile device, wherein the walkie talkie is not capable of receiving charge from the mobile device.

6. Apparatus comprising:
a portable body,
a two-way radio frequency transceiver walkie talkie in the portable body,
a portable power supply in the portable body connected to the radio transceiver walkie talkie, and
an output power jack on the body connected to the portable power supply,
an adapter in the portable body connecting the portable power supply to the output power jack,
a mobile device independent and separate from the portable body, and
a portable removable unidirectional connection connecting the power supply to the mobile device to recharge a battery in the mobile device from the portable power supply, wherein the walkie talkie is not capable of receiving charge from the mobile device.

7. The apparatus of claim 6, wherein the power supply comprises replaceable batteries.

8. The apparatus of claim 7, wherein the replaceable batteries are rechargeable batteries.

9. The apparatus of claim 7, wherein the replaceable batteries are non-rechargeable batteries.

10. The apparatus of claim 6, wherein the mobile device is a cell phone.

11. The apparatus of claim 6, wherein the power jack is at least one USB port.

12. The apparatus of claim 11, further comprising a mini USB port mounted on the body and connected to the power supply.

13. The apparatus of claim 6, further comprising an adapter plate adapted for affixing to the portable body, the adapter plate having the output jack.

14. The apparatus of claim 13, wherein the output jack is a USB port.

15. The apparatus of claim 13, wherein the output jack is a USB port, and further comprising a mini USB port mounted on the adapter plate and connected to the power supply.

\* \* \* \* \*